(12) United States Patent
Northrop

(10) Patent No.: US 10,448,620 B2
(45) Date of Patent: Oct. 22, 2019

(54) NUTRIENT CAPTURE SYSTEM

(71) Applicant: Timberfish, LLC, Amherst, NY (US)

(72) Inventor: Jere Northrop, Amherst, NY (US)

(73) Assignee: Timberfish, LLC, Amherst, NY (US)

( * ) Notice: Subject to any disclaimer, the term of this patent is extended or adjusted under 35 U.S.C. 154(b) by 18 days.

(21) Appl. No.: 14/505,789

(22) Filed: Oct. 3, 2014

(65) Prior Publication Data

US 2015/0101539 A1 Apr. 16, 2015

Related U.S. Application Data

(60) Provisional application No. 61/886,304, filed on Oct. 3, 2013.

(51) Int. Cl.
*A01K 63/04* (2006.01)
*A01K 63/00* (2017.01)
*A01K 61/85* (2017.01)

(52) U.S. Cl.
CPC .......... *A01K 63/045* (2013.01); *A01K 61/85* (2017.01); *A01K 63/003* (2013.01); *A01K 63/04* (2013.01); *Y02A 40/845* (2018.01)

(58) Field of Classification Search
CPC .... A01G 31/00; A01G 63/045; A01K 63/045; A01K 63/003
USPC .......................................... 119/226; 47/62 A
See application file for complete search history.

(56) References Cited

U.S. PATENT DOCUMENTS

| | | | | |
|---|---|---|---|---|
| 2,306,027 A | * | 12/1942 | Swaney | A01K 63/003 119/246 |
| 5,127,366 A | * | 7/1992 | Kim | A01G 31/02 119/246 |
| 5,618,428 A | * | 4/1997 | Oslund | A01K 63/045 119/246 |
| 2009/0301399 A1 | * | 12/2009 | Brown | A01G 31/02 119/226 |
| 2012/0091058 A1 | * | 4/2012 | Byrd | A01K 63/04 210/610 |

(Continued)

OTHER PUBLICATIONS

Horman, J. J. (Sep. 7, 2010). Understanding Soils Microbes and Nutrient Recycling. Retrieved from Ohioline: http://ohioline.osu.edu/factsheet/SAG-16.*

*Primary Examiner* — Monica L Williams
*Assistant Examiner* — Aaron M Rodziwicz
(74) *Attorney, Agent, or Firm* — The Webb Law Firm

(57) ABSTRACT

An apparatus includes a tank having a body of water, the tank having a submerged plant material zone having plant material submerged within the body of water. The apparatus also includes an irrigated plant material platform, including additional plant material which is separated from the submerged plant material. The apparatus further includes an animal raising zone in fluid communication with at least a portion of the body of water, the animal raising zone separated from the submerged plant material zone by a porous filter. The apparatus includes a tank influent stream for passing water through the plant material zone and subsequently through the animal raising zone. The system includes a recycle loop having a pump disposed within the animal raising zone for pumping a waste product from the animal raising zone to the irrigated plant material platform. The animal raising zone may be a fish raising zone.

20 Claims, 8 Drawing Sheets

(56) References Cited

U.S. PATENT DOCUMENTS

2014/0223819 A1* 8/2014 Coghlan .............. A01K 63/045
47/62 R

* cited by examiner

NUTRIENT CAPTURE SYSTEM

CROSS-REFERENCE TO RELATED APPLICATION

The present application claims the benefit of U.S. Provisional Patent No. 61/886,304, filed Oct. 3, 2013, the entire disclosure of which is hereby incorporated by reference.

BACKGROUND OF THE INVENTION

Field of the Invention

The present invention relates to an apparatus for commercially producing large quantities of fish and aquatic organisms. The apparatus generates a microbial biomass from the degradation of harvested plant material and nutrient substrates, and uses this microbial biomass to generate and provide food for the fish and aquatic organisms, and to treat the wastes produced by the fish and aquatic organisms.

Description of the Related Art

The seafood industry is facing a growing crisis. The capture of fish from the ocean has peaked but the demand for fish continues to rise. Approximately, 75% of the world's fishing grounds are fully exploited, over exploited, or severely depleted. Over 90% of the large fish in the ocean have been harvested and may never be regained. The most desirable wild fisheries are collapsing, and many depleted species might never recover because their habitat has been destroyed or too few survivors remain to successfully reproduce.

Many feel that aquaculture is the only sustainable method for supplying fish to the world's population. Currently almost half of all food fish for human consumption is produced by aquaculture. In order to maintain the current level of global per capita fish consumption and given the likelihood of stagnant harvests from capture fisheries, it will be necessary for aquaculture to provide a much greater share of the food fish supply in the future.

However; aquaculture itself is facing a number of critical issues. Current aquaculture practices rely heavily on fishmeal and grain for feed. Because of this aquaculture is simply recycling existing food sources and is not itself a source of new food. Because the largest single production cost in aquaculture is for feed, the dependence on grain supplies means that feed could become disproportionately expensive with increases in grain and energy prices. In addition, by relying heavily on fishmeal and oil as substantial ingredients in fish feeds, aquaculture is contributing to overfishing and this will jeopardize the future availability of fishmeal and fish oil.

The grain and fishmeal that constitute aquaculture feeds may also be a significant source of contamination (pesticides, heavy metals, etc.) in fish because of bioaccumulation. The steadily increasing pollution of the world's oceans is reaching a point where it is now threatening the entire marine food supply chain. The contamination caused by oil, nutrients, sewage, and toxic chemicals has been well documented in the past, but these threats may soon be eclipsed by an even greater danger, that of plastic. The oceans now contain six times more plastic than plankton, which is the basis of the marine food chain. Furthermore, as the plastic is broken down into smaller and smaller particles it is entering the food chain itself. The health risk which this may pose is at present unknown. However, given the asbestos experience, there is serious concern that small molecular weight plastic (plastic bits) contamination could eventually become incorporated into biological cellular structures thereby making all ocean produced seafood and seafood products unfit for human consumption in the future.

In addition to these factors, many aquaculture operations themselves are contributing to the environmental pollution of the world's waters. Most current aquaculture systems are either flow-through systems or they are systems embedded in cages within large bodies of water (lakes, streams, and oceans). Consequently the nutrient and organic wastes discharged by these systems accounts for an increasing build-up of anoxic sediments and the nutrient pollution and eutrophication of lakes and coastal zones. Changes in oxygen, temperature, pH, suspended solids, ammonia, organic nitrogen, and phosphorus are often measurable downstream from hatcheries. This again increases the environmental problems and further threatens long term sustainable future production.

Phosphorus and nitrogen in farm wastes primarily originate from feeds and are of greatest concern due to their role in nutrient enrichment (eutrophication). Eutrophication occurs when natural waters receive excess quantities of nutrients which often results in blooms of noxious algae or excessive growth of higher plants. When the plants die, the decaying organic material can deplete water of oxygen to a degree detrimental to other aquatic organisms. This often results in fish kills and a serious impairment of the aquatic environment.

The primary sources of aquaculture wastes are from fish excretion and uneaten feed. Only about 30% of feed phosphorus and nitrogen are retained by salmonids, even if they consume all of the feed fed to them.

Commercial feeds are often formulated to contain a slightly higher level of a nutrient than is required by the species for maximum growth. The extra nutrients are added to feeds because few if any feed ingredients are completely digested and absorbed and so the extra nutrients serve as a safety margin to insure that requirements for maximum growth are met. Unfortunately, these safety margins contribute, in part, to the production of excess wastes in fish farm effluents.

As a result of these problems, the future of seafood as a significant component of the human diet is in serious doubt. Wild fisheries are in decline and are becoming increasingly polluted. Aquaculture, as it is practiced today, is not environmentally sound and does not offer a long-term sustainable solution.

Accordingly, the present invention has been developed in view of limitations, shortcomings and other disadvantages of conventional production practices.

SUMMARY OF THE INVENTION

To resolve the practical economic and business problems associated with large scale recirculating aquaculture production systems, this invention presents a novel modular apparatus comprising a harvested plant material degradation system, a microbial growth system in fluid contact with the harvested plant material degradation system, and an intermediary animal system in biomass-transfer interaction with the microbial growth system.

The technology results in high quality fish production which constitutes a new food source in that it does not require fishmeal or grain as inputs. The technology is also its own water, wastewater, and waste treatment system and it produces a clean product with minimal to no contamination of the environment.

The modular apparatus provides a series of connected environments coupled by fluid transfer such that the harvested plant material degradation system can provide a substrate for the microbial growth system, and the harvested plant material degradation system can include polyculture plant material. The microbial growth system can produce a concentrated biomass, such as having a microbial concentration of at least $10^8$ microbes per milliliter. The intermediary animal comprises worms, annelids, arthropods, mollusks, and/or fish. The system can further include a product animal such as a crustacean, mollusk, fish, bird, pig, goat, or cow by the consumption of the intermediary animal.

It is another object of the present invention to provide a modular apparatus facilitating the microbial degradation of harvested polyculture plant material to form a concentrated microbial biomass, and providing the concentrated microbial biomass to an intermediary animal for consumption by the intermediary animal. The apparatus can also facilitate the harvesting of an intermediary animal for use as a feed and/or food.

The harvested polyculture plant material can include photosynthetically produced material obtained from more than one species of plant, or photosynthetically produced material obtained from a single species of plant. The intermediary animal may include worms, annelids, arthropods, mollusks, and/or fish.

It is another object of the present invention to provide a modular apparatus for the production of food produced by microbially degrading harvested polyculture plant material to form a concentrated microbial biomass, and providing the concentrated microbial biomass to an intermediary animal for consumption by the intermediary animal.

It is yet another object of the apparatus of the present invention to provide an environment for producing a product animal which includes the steps of providing a product animal growth area having an outlet for waste, providing a harvested plant material collection area having an outlet for degradation products, providing a microbial growth system for producing a bacterial biomass having an outlet for effluent, directing at least some waste from the outlet of the product animal growth area to the harvested plant material collection area, directing at least some degradation products from the harvested plant material collection area outlet to the microbial growth system, directing at least some of the microbial biomass produced in the microbial growth system to an intermediary animal for consumption by the intermediary animal, and directing the intermediary animal to product animal growth area for consumption by the product animal. The intermediary animal can include worms, annelids, arthropods, mollusks, and/or fish. The product animal can include crustaceans, mollusks, fish, birds, pigs, goats, and/or cows.

It is a further object of the present invention to provide an apparatus comprising multiple modular units for producing food, each of which comprises at least one food producing unit including a harvested plant material degradation system, a microbial growth system in fluid contact with the harvested plant material degradation system, and an intermediary animal system in biomass-transfer interaction with the microbial growth system.

It is a further object of the present invention to provide an aquaculture apparatus which does not require cultivation or pesticide use for its raw material and which enables the sequestration of significant amounts of carbon in a food production practice. The apparatus of the present invention can be used to produce food from land which currently contains a wetland or is forested and which does not currently produce a significant source of food for human consumption. The apparatus of the present invention can result in the elimination or minimization of pollution of ground and surface waters with nutrients, pesticides, and other chemical compounds.

It is yet a further object of the apparatus of the present invention to provide food and/or feed that is produced in a manner which does not cause significant pollution to the general environment, and sequesters large quantities of carbon, thereby reducing the impact of atmospheric carbon dioxide on global warming. This invention may further enable feed and/or food to be produced on large land areas which are not currently producing feed and/or food, and to do this in an environmentally compatible fashion.

The system may include a comprehensive environmental biotechnology that integrates nutrient and waste management with renewable energy production, topsoil production, bioremediation, biomonitoring, and production of feeds and food. It will have widespread application in the treatment of wastes and wastewaters from municipal and industrial Water Pollution Control Facilities (WPCFs) and Confined Animal Feeding Operations (CAFOs) in agriculture.

The technology may include a dynamic system wherein naturally evolving complex populations of microbes and invertebrates synergistically interact to capture and concentrate nutrients while degrading organic substrates. The process of the system comprises the construction of production ecosystems around one or more organic substrates and at least one nutrient rich substrate. These substrates are then bioconverted into a new material amenable to renewable energy generation, topsoil production and restoration, and protein production, by managing different levels of organism dynamics relative to nutrient availabilities and concentrations. These may vary in cyclical or steady state patterns as a result of controlling environmental variables and water movement throughout the various environmental zones and subzones within the production ecosystem. The process is adaptable to a variety of simple or complex organic substrates and nutrient matrices.

The process will minimize the release of greenhouse gas pollutants to the atmosphere, hence it differs significantly from conventional composting type technologies. It will produce a solid production residue that can be used for fuel for heating or power generation and has the potential for use as a substrate for biofuel production. It also may be used for soil amendments, potting soils, soil bioremediation, the manufacture and enhancement of topsoil, and the production of proteins which may be used for feeds or food. The process will also discharge small amounts of clean reusable water. The technology can produce significant reductions in nutrient pollution and hence can qualify for nutrient credit trading where applicable.

To resolve the practical economic and business problems associated with large animal agriculture confined animal feeding operations (CAFOs) and water pollution control facilities (WPCFs), this invention presents a novel modular apparatus comprising organic substrates and at least one nutrient rich substrate emanating from the CAFOs or WPCFs, a microbial growth system in fluid contact with the organic and nutrient rich substrates, and an intermediary animal system in biomass-transfer interaction with the microbial growth system.

The modular apparatus provides a series of connected environments coupled by fluid transfer such that the organic and nutrient rich substrates can provide an environment for the microbial growth system, and the organic substrate can include polyculture plant material. The microbial growth system can produce a fixed film concentrated biomass. The intermediary animal comprises worms, annelids, arthropods, mollusks, and/or fish. The system can further include a product animal such as a crustacean, mollusk, fish, bird, pig, goat, or cow by the consumption of the intermediary animal.

It is another object of the present invention to provide a modular apparatus facilitating the treatment of waste streams emanating from CAFOs or WPCFs via the microbial degradation of organic and nutrient rich substrates including harvested polyculture plant material originating independently from the CAFOs or WPCFs, to form a concentrated microbial biomass, and providing the concentrated microbial biomass to an intermediary animal for consumption by the intermediary animal. The apparatus can also facilitate the harvesting of an intermediary animal for use as a feed and/or food.

The harvested polyculture plant material can include photosynthetically produced material obtained from more than one species of plant, or photosynthetically produced material obtained from a single species of plant. The intermediary animal may include worms, annelids, arthropods, mollusks, and/or fish.

It is another object of the present invention to provide a modular apparatus for the production of solid residues usable for renewable energy production and the production of soil amendments, potting soils, soil bioremediation materials, the manufacture and enhancement of topsoil, and the production of food and feeds from waste streams from CAFOs and WPCFs by microbially degrading organic and nutrient rich substrates including harvested polyculture plant material to form a concentrated microbial biomass, and providing the concentrated microbial biomass to an intermediary animal for consumption by the intermediary animal.

It is yet another object of the apparatus of the present invention to provide an environment for producing a product animal and solid residues usable for renewable energy production and the production of soil amendments, potting soils, soil bioremediation materials, and the manufacture and enhancement of topsoil from the waste streams emanating from CAFOs and WPCFs which includes the steps of providing a product animal growth area having an outlet for waste, providing an organic and nutrient rich substrate collection area having an outlet for degradation products, providing a microbial growth system for producing a bacterial biomass having an outlet for effluent, directing at least some waste from the outlet of the product animal growth area to the organic and nutrient rich substrate collection area directing at least some degradation products from the organic and nutrient rich substrate collection area outlet to the microbial growth system, directing at least some of the microbial biomass produced in the microbial growth system to an intermediary animal for consumption by the intermediary animal, and directing the intermediary animal to product animal growth area for consumption by the product animal. The intermediary animal can include worms, annelids, arthropods, mollusks, and/or fish. The product animal can include crustaceans, mollusks, fish, birds, pigs, goats and/or cows.

It is a further object of the present invention to provide an apparatus comprising multiple modular units for producing food, feed, and solid residues usable for renewable energy production, the production of soil amendments, potting soils, soil bioremediation materials, and the manufacture and enhancement of topsoil from the waste streams emanating from CAFOs and WPCFs, each module of which comprises at least one food or feed producing unit including an organic and nutrient rich substrate collection area, a microbial growth system in fluid contact with the organic and nutrient rich substrate collection area, and an intermediary animal system in biomass-transfer interaction with the microbial growth system.

It is a further object of the present invention to provide an aquaculture apparatus which incorporates the waste streams emanating from CAFOs or WPCFs and which does not require cultivation or pesticide use for its raw material comprising harvested plant material and which enables the sequestration of significant amounts of carbon in a food or feed production practice. The apparatus of the present invention can be used to produce food or feed from land which currently contains a wetland or is forested and which does not currently produce a significant source of food or feed. The apparatus of the present invention can result in the elimination or minimization of pollution of ground and surface waters with nutrients, pesticides, and other chemical compounds.

It is yet a further object of the apparatus of the present invention to provide food and/or feed that is produced in a manner which does not cause significant pollution to the general environment, and sequesters large quantities of carbon, thereby reducing the impact of atmospheric carbon dioxide on global warming. This invention may further enable feed and/or food to be produced on large land areas which are not currently producing feed and/or food, and to do this in an environmentally compatible fashion.

DETAILED DESCRIPTION OF THE INVENTION

The apparatus of the present invention comprises a tank or other bounded structure, part of which contains a bounded body of water. There are four distinct functional zones within the apparatus and the apparatus as a whole receives an influent stream and discharges an effluent stream. Usually the influent and effluent are located at opposite ends of the apparatus. Two of the functional zones within the apparatus contain plant material such as wood chips, branches, sticks, grasses, plant stalks, logs, leaves, or other forms of plant material. One of the zones containing plant material will be submerged in water while the other plant material containing zone will be above or adjacent to the submerged zone but will not itself be submerged. A third zone will contain water and will be a fish or aquatic organism raising habitat. This zone may or may not contain plant material but if plant material is present, it will be of such a volume and configuration that provides adequate space for the health and growth of the fish or aquatic organisms. In preferred embodiments of the apparatus of the invention, water from the third zone will be periodically or continuously irrigated over the plant material in the non-submerged plant material zone. In these preferred embodiments of the apparatus of the invention, there will also be a recycle flow of effluent water back to the influent to the apparatus. The fourth zone will comprise an air space above the fish and aquatic organism raising zone. This air space will be suitably defined by a wall, fence, net, or other similar structure so that the fish and aquatic organisms cannot escape from the fish raising zone.

There will be a barrier which separates the plant material containing zones from the fish and aquatic organism raising zone. This barrier will comprise a fence, net, or other similar structure such that water and small organisms can pass freely between the zones but that most of the plant material and the larger organisms being raised in the apparatus cannot pass between the zones.

In the preferred embodiments of the invention, aeration will be supplied to the fish and aquatic organism zone. Aeration may also be supplied to the influent flow and the effluent flow, and may also be supplied to plant material zones themselves.

Wastes produced by the fish and aquatic organisms will pass into the plant material zones and therein will be acted upon by microbes living within those zones. In preferred embodiments of the apparatus of the invention, solid wastes will be pumped from the bottom of the fish zone and will be introduced to the top of the irrigated plant material zone. Some soluble wastes may be pumped into the irrigated zone along with the solid wastes, but most of the soluble wastes will be pumped into the submerged zone via a recycle of some of the effluent back to the influent.

Figure 1:
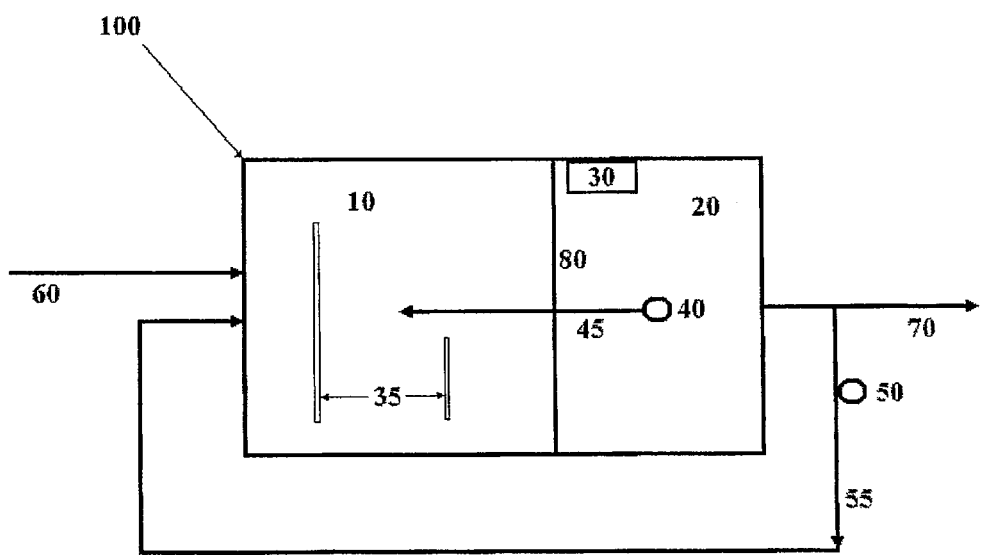
FIG. 1 is a schematic representation of a top view of a recirculating system module in accordance with an embodiment of the present invention.

FIG. 1 shows a top view of a preferred embodiment of the apparatus of the invention. Here a rectangular tank 100 constructed in concrete, plastic, fiberglass, or some such material is buried in the ground so that most of the tank itself is below grade. An influent stream 60 enters the tank at one end of a zone 10 containing both irrigated and submerged plant material zones. This influent flows through the submerged zone and then passes through a porous barrier 80 into an aeration and fish raising zone 20. Aeration is supplied to the fish raising zone 20 via an aerator 30 located within zone 20. A pump 40 located at the bottom of the fish raising zone 20 pumps water and solid and soluble wastes produced by the fish. These wastes are delivered via a pipe 45 up to the top of the irrigated plant material zone in 10. Effluent from the fish raising zone 20 is discharged via an effluent line 70. Some of the effluent is recycled by a pump 50 and sent back via a pipe 55 to the influent end of the submerged zone in 10.

Additional oxygenation may be supplied to the bottom of the plant material zone in 10. This may comprise forced air distributed through coarse or fine bubble diffusers 35 located in various configurations at the bottom of the plant material. It also may comprise the injection of water from the fish raising zone 20 through the diffusers located at the bottom of the plant material. If oxygenated water is used, the dissolved oxygen levels may be elevated to achieve or exceed saturation levels. This could be induced through additional pressure aeration of the water stream or by the introduction of pure oxygen or air with elevated levels of oxygen into the water stream.

Figure 2:
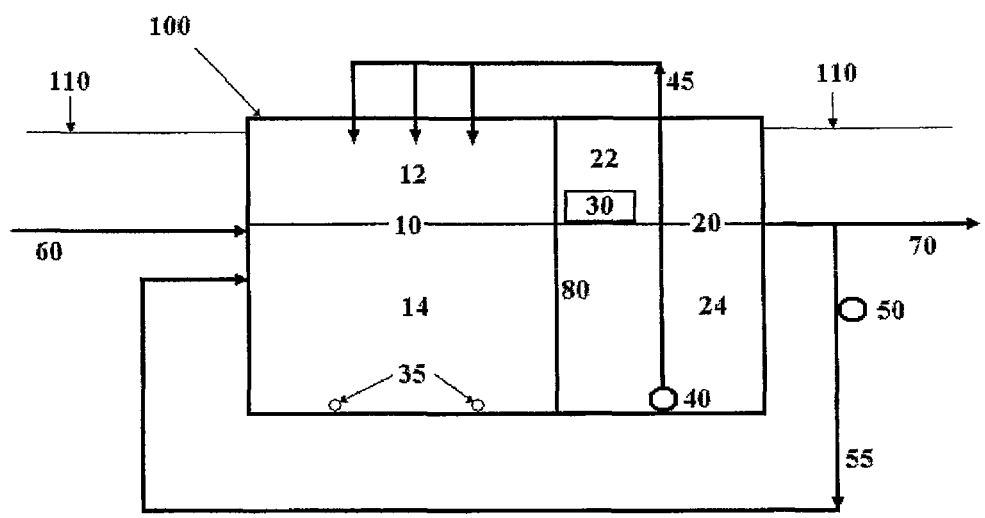
FIG. 2 is a schematic representation of a side view of a recirculating system module in accordance with an embodiment of the present invention.

FIG. 2 shows a side view of the apparatus shown in FIG. 1. The rectangular tank 100 is normally buried in the ground so that the ground level 110 is either at the top of the tank or close to the top of the tank. For example if the tank is eight feet deep the bottom of the tank could be somewhere between six and eight feet below ground level. The tank will contain water and the water level will always be below ground level. In preferred embodiments of the apparatus of the invention, the water level will be ⅝ of the depth of the tank and may range from ⅜ to ⅝ of the tank depth.

The zone 10 which contains plant material is divided into additional zones as follows. Zone 12 will contain irrigated plant material and will reside above the water level in zone 10. Zone 14 will contain plant material that is submerged in water in zone 10. In preferred embodiments of the apparatus of the invention, zone 12 will be located directly above zone 14 and may be distinguished from zone 14 only by the fact that the plant material in zone 12 is not submerged while the plant material in zone 14 is submerged. In other embodiments of the apparatus of the invention, there may be a space between zones 12 and 14 which does not contain plant material. This space will normally be above the water level.

An influent stream 60 enters the tank at one end of the submerged zone 14 containing submerged plant material. This influent flows through the submerged zone and then passes through a porous barrier 80 into a fish raising zone 24 which is part of the zone 20 shown in FIG. 1. Aeration is supplied to the fish raising zone 24 via an aerator 30 located within 20. Above the fish raising zone 24 there will be an air zone 22 which will be the source of the air used in the aeration processes 30 and 35. The air zone will in general be located below grade and will be connected to air outside of the apparatus. The connection between the air within the apparatus and the air outside of the apparatus may comprise a heat exchanger to help maintain the inside of the apparatus at a more even temperature than outside ambient air temperature. This may be especially true during winter and summer months when ambient air temperatures may be significantly lower or higher than the optimal growth temperature for the fish residing within the apparatus.

A pump 40 located at the bottom of the fish raising zone 24 pumps water and solid and soluble wastes produced by the fish. These wastes are delivered via a pipe 45 up to the top of the irrigated plant material zone 12 where they may be sprayed over the top of the plant material or discharged into some other structure which spreads the water out over the top of the plant material. These solid and soluble wastes and the water conveying them then trickle down through the plant material in the irrigated zone 12 until they reach the submerged zone 14.

Effluent from the fish raising zone 24 is discharged via an effluent line 70. Some of the effluent is recycled by a pump 50, through a pipe 55 back to the influent stream 60 or back to the influent end of the submerged zone 14 in the apparatus of the invention.

In another preferred embodiment of the apparatus of the invention, two more zones may be added to the apparatus as described in FIGS. 1 and 2. This embodiment is shown in top view in FIG. 3, and in side view in FIG. 4.

In this embodiment, a new zone 91 is added to receive the influent flow 60 and the recycle flow 55 prior to their introduction into the submerged plant material zone 14 in section 10 of the apparatus. In this new zone, the influent and the recycle flows will be pretreated with air or oxygen supplied by an aeration device 30 and may be mixed together before they pass through a porous net or fence type barrier 82 which holds the plant material in zone 10 and prevents it from mixing into zone 91.

If a water heat exchanger system is used to control the water temperature within the apparatus, it will generally be located within the zone 91.

A second zone 95 may also be added to the apparatus to further treat the effluent prior to its discharge or recycle. This additional treatment may comprise aeration, mixing, filtration, chemical addition for the precipitation of nutrients, or other similar treatment procedures.

Figure 3:
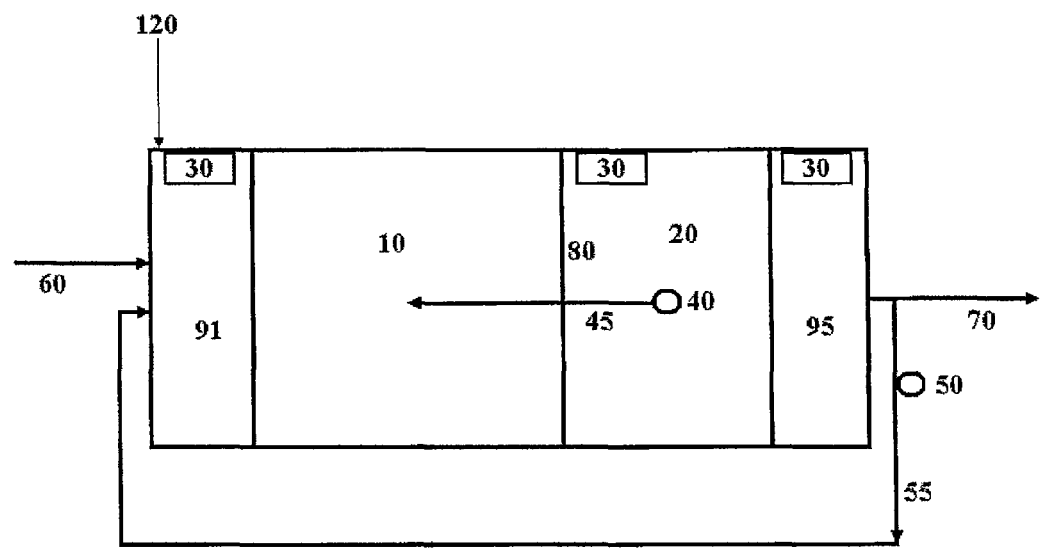
FIG. 3 is a schematic representation of a top view of a recirculating system module expanded to accommodate insertion of additional modules in accordance with an embodiment of the present invention.
Figure 4:
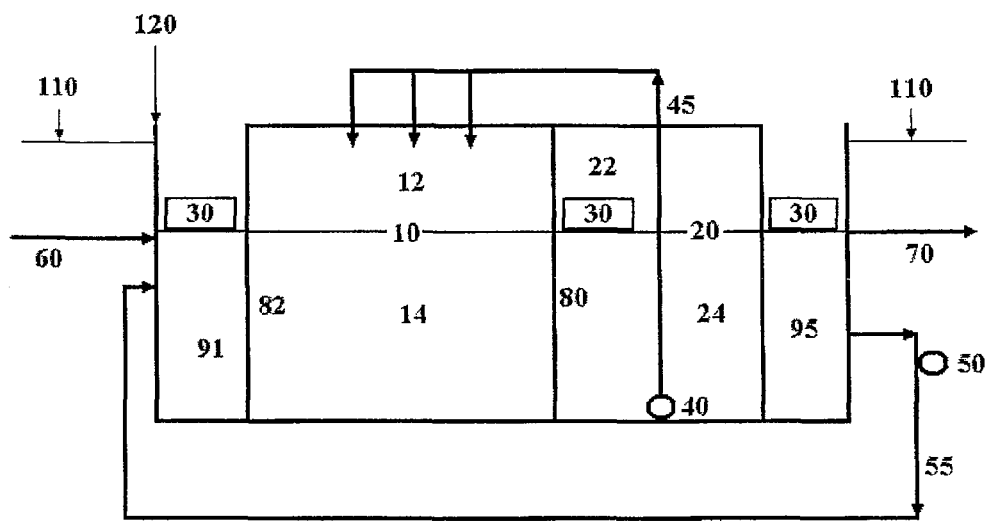
FIG. 4 is a schematic representation of a side view of a recirculating system module expanded to accommodate insertion of additional modules in accordance with an embodiment of the present invention.
Figure 5:
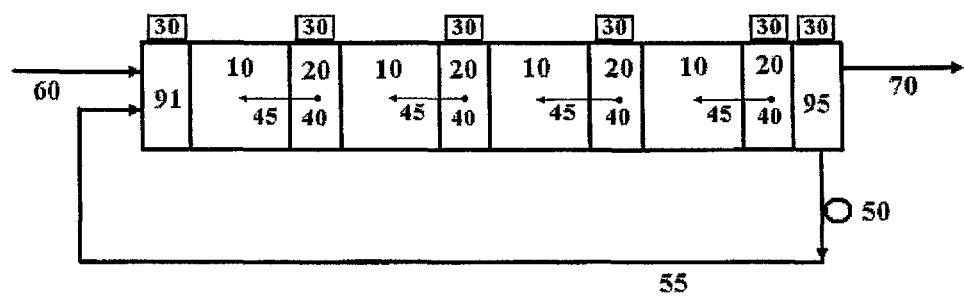
FIG. 5 is a schematic representation of a top view of a linear four module recirculating system in accordance with an embodiment of the present invention.

The configurations shown in FIGS. 3 and 4 can be expanded in a further embodiment of the apparatus of the invention as shown from a top view in FIG. 5. Here several modular units as shown in FIGS. 1 and 2 are combined with the additional zones 91 and 95 as shown in FIGS. 3 and 4 to produce a linear apparatus with multiple fish raising and water treatment zones. The influent flow 60 is mixed with a recycle flow 55 and then passed through a series of alternating plant material zones 10 and fish raising zones 20. Some of the solid and soluble wastes produced in the fish raising zones are recycled back to the immediately upstream plant material zone where they are removed from the water flow. A series of porous nets or fences, shown as 80 in FIGS. 1 through 4, separate the various zones while still allowing microbial and small organism migration back and forth between the plant material zones and the fish raising zones.

Figure 6:
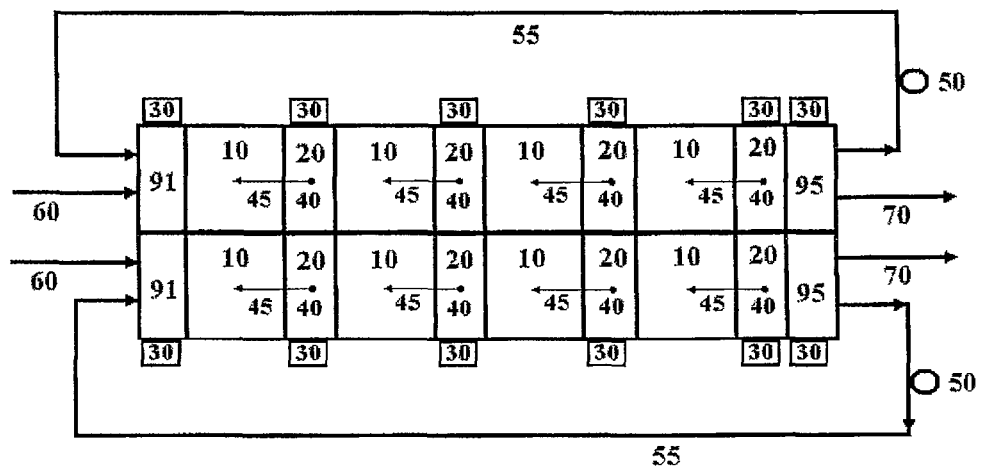
FIG. 6 is a schematic representation of a top view of two linear four module recirculating systems constructed side by side in accordance with an embodiment of the present invention.

The embodiment of the apparatus of the invention can be further expanded as shown from a top view in FIG. 6. Here two multiple trains of the apparatus are combined side by side into a two parallel train apparatuses. This has the additional advantage of reducing construction costs via a shared wall separating the two trains. It also makes for a more compact total apparatus should the apparatus be contained within a building or other similar structure such as a greenhouse, barn, or the like.

Figure 7:
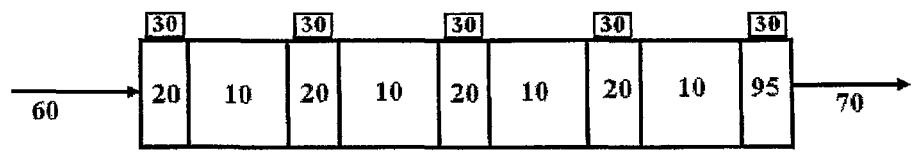
FIG. 7 is a schematic representation of a top view of a linear four module non-recirculating system in accordance with an embodiment of the present invention.

In another embodiment of the apparatus of the invention, the various module units as shown in FIGS. 1 through 4 may be simplified and connected in a flow through series as shown from the top in FIG. 7. Here there is no recycle either of solid or liquid waste. All waste produced in the fish or aquatic organism raising zones 20 is treated by a downstream submerged plant material zone 10. The final effluent 70 will have passed through a final downstream submerged plant material zone 10 and a final water treatment zone 95 prior to being discharged.

Figure 8:
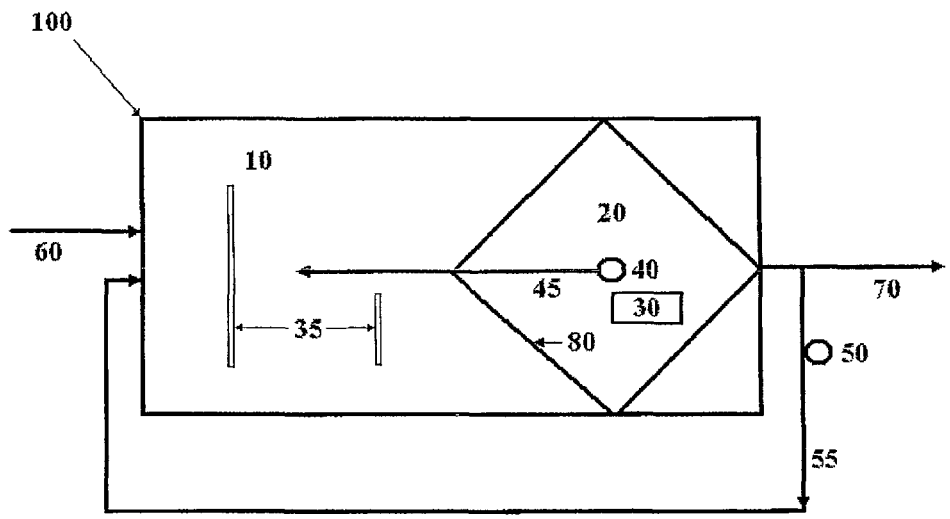
FIG. 8 is a schematic representation of a top view of an alternative configuration of the recirculating system module shown in FIG. 1, in accordance with an embodiment of the present invention.

In additional embodiments of the apparatus of the invention, the geometry of the fish or aquatic organism raising zones 20 may vary to include rectangles as shown in top view in FIGS. 1 through 4 or they may comprise squares, hexagons, octagons, or similar geometric polygons as seen from a top view. Incorporation of these various different shapes will change the shapes of the corresponding plant material zones 10 so that the interface 80 between the zones stays porous as described previously. One of these possible alternative configurations is shown in FIG. 8.

A system of mass balance accounting is also used to control and manage the production process. This mass balance approach will track some or all of the following chemical elements: carbon, hydrogen, oxygen, nitrogen, phosphorus, sulfur, sodium, potassium chloride, calcium, magnesium, iron, manganese, copper, zinc, and nickel. Minerals, salts, and nutrients will be introduced as part of the plant material or as fertilizer or feed additives, and a series of products including fish, feeds, and processed foods will be removed from the system. To balance the elements removed in the products, nutrients and minerals will need to be added in amounts that maintain the chemical balance in the system.

In a further configuration, the system combines wastewater resources with other available biodegradable materials and use this as the basis for a new production process. Normally this will involve the use of renewable plant material as this is the largest and most universally available source of clean biodegradable material. However, many other materials could be used including cardboard and paper, general municipal solid waste, food processing wastes, residential leaves and brush, or combinations of these and other materials. These biodegradable substrates would be combined with the nutrients and water from domestic and municipal wastewaters, or from wastes and wastewaters emanating from agricultural facilities, in a suitably designed production facility. Then, an extensive ecological community could be developed and managed to achieve the objectives of clean water, renewable energy, beneficial soil amendments, high protein feeds and food, and building materials.

The process and apparatus of this invention that can do all this is based on a dynamic system wherein naturally evolving complex populations of microbes and invertebrates synergistically interact to capture and concentrate nutrients while degrading organic substrates. The process of the system comprises the construction of production ecosystems around one or more organic solid substrates and at least one nutrient rich substrate such as a nutrient containing wastewater. These substrates are then bio-converted into new materials by managing different levels of organism dynamics relative to nutrient availabilities and concentrations. These may vary in cyclical or steady state patterns as a result of controlling environmental variables and water movement throughout the various environmental zones and subzones within the production ecosystem. The process is adaptable to a variety of simple or complex organic substrates and nutrient matrices.

The process will minimize the release of greenhouse gas pollutants to the atmosphere. It will produce a solid production residue that can be used for fuel for heating or power generation and has the potential for use as a substrate for biofuel production. Depending on the levels of toxic compounds in the input materials, the production products and byproducts may be used for soil amendments, potting soils, soil bioremediation, the manufacture and enhancement of topsoil, or the production of high protein feeds and food. Usually the process will discharge clean reusable water that could be used as feed streams for drinking water plants. Finally, these systems can serve a major environmental function in that they can provide a strong economic incentive to restore much of the forest and wetland habitat that has been destroyed over the last several hundred years. Such habitats can be managed to produce large quantities of plant material that can be harvested in a manner that promotes, rather than destroys, the aesthetics, biodiversity, and ecological stability of such habitats.

The process and apparatus of this invention comprises a series of modular underground tank units which are connected in trains of ten units each. Multiple trains are located in barn type buildings. Each modular unit contains three distinct but interconnected functional zones and the unit as a whole receives one or two influent streams and discharges an effluent stream. Two of the functional zones within each modular unit contain solid biodegradable material while the third zone contains water. As mentioned before, many different types of biodegradable material may be used within the system, but for the purpose of this illustration, wood chips will be used.

One of the zones containing solid material will be submerged in water and this zone will contain primarily wood chips. The other solid material containing zone will be above the submerged zone but will not itself be submerged. This zone will contain wood chips. A third zone will contain water and will be a habitat for the growth of suspended microbial flocs, invertebrates, and fish. Water from this zone will be periodically or continuously irrigated over the plant material in the non submerged solid material zone. There may also be a recycle flow of effluent water back to the influent to the system.

There will be a porous barrier which separates the solid material containing zones from the water zone. This barrier will comprise a fence, net, or other similar structure such that water and small organisms can pass freely between the zones but that most of the plant material and the larger organisms being raised in the apparatus cannot pass between the zones.

Aeration will be supplied to the water zone, the influent flow, and the effluent flow, and may also be supplied to the solid material zones themselves. Microbial biomass and wastes produced by any invertebrates or fish in the water zone will pass into the plant material zones and therein will be acted upon by additional microbes living within those zones. Solid wastes will be pumped from the bottom of the water zone and will be introduced to the top of the irrigated plant material zone. Some soluble wastes may be pumped into the irrigated zone along with the solid wastes, but most of the soluble wastes will flow into the submerged zone via a recycle of some of the effluent back to the influent.

Figure 9:
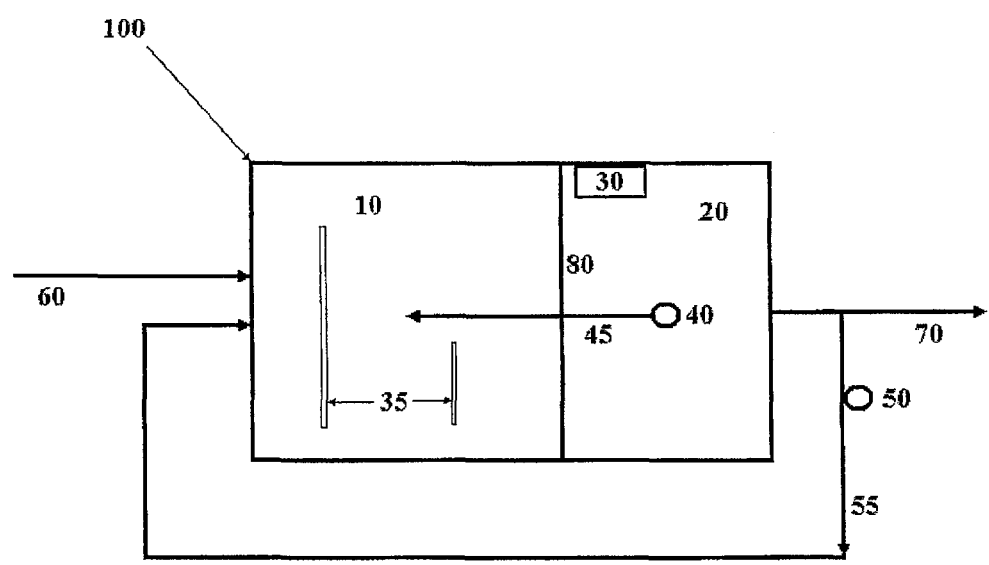
FIG. 9 is a schematic representation of a top view of a recirculating system module in accordance with an embodiment of the present invention.
Figure 10:
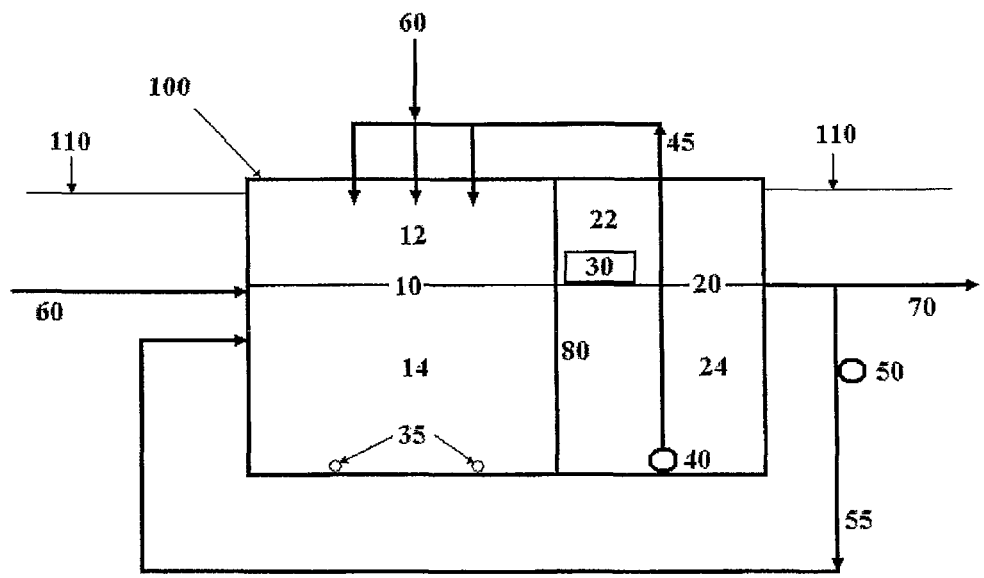
FIG. 10 is a schematic representation of a side view of a recirculating system module in accordance with an embodiment of the present invention.

FIG. 9 shows a top view of a modular unit and FIG. 10 shows a side view of the same unit. Here the modular unit 100 will be a part of a concrete tank that is buried in the ground so that most of the tank itself is below grade (110 in FIG. 2). An influent stream 60 enters the modular unit at one end or at the top of a zone 10 containing both irrigated and submerged plant material zones. This influent flows through the submerged zone, or trickles down through the irrigated zone into the submerged zone, and then passes through a porous barrier 80 into an aeration and animal raising water zone 20. Aeration is supplied to the water zone 20 via an aerator 30 located within 20. A pump 40 located at the bottom of the water zone pumps water, settled microbial solids and solid and soluble wastes produced by the invertebrates and fish. These wastes are delivered via a pipe 45 up to the top of the irrigated plant material zone in 10. Effluent from the water zone 20 is discharged via an effluent line 70. Some of the effluent is recycled by a pump 50 and sent back via a pipe 55 to the influent end of the submerged zone in 10.

Additional oxygenation may be supplied to the bottom of the plant material zone in 10. This may comprise forced air distributed through coarse or fine bubble diffusers 35 located in various configurations at the bottom of the plant material. It also may comprise the injection of water from the water zone 20 through the diffusers located at the bottom of the plant material. If oxygenated water is used, the dissolved oxygen levels may be elevated to achieve or exceed saturation levels. This could be induced through additional pressure aeration of the water stream or by the introduction of pure oxygen or air with elevated levels of oxygen into the water stream.

FIG. 10 shows a side view of the modular unit shown in FIG. 9. The rectangular tank 100 is normally buried in the ground so that the ground level is either at the top of the tank or close to the top of the tank. For example, for a tank that is eight feet deep the bottom of the tank could be somewhere between six and eight feet below ground level. The tank will contain water and the water level will always be below ground level.

The zone 10 which contains plant material is divided into additional zones as follows. Zone 12 will contain irrigated plant material and will reside above the water level in zone 10. Zone 14 will contain plant material that is submerged in water in zone 10. An influent stream 60 enters the tank at one end of the submerged zone 14 containing submerged plant material. This influent flows through the submerged zone and then passes through a porous barrier 80 into a water zone 24 which is part of the zone 20 shown in FIG. 9. Aeration is supplied to the water zone 24 via an aerator 30 located within 20.

Alternatively, some or all of the influent flow 60 may be applied or spray irrigated at the top of the irrigated zone 12. This influent will trickle down through the irrigated zone and then enter the submerged zone 14.

A pump 40 located at the bottom of the water zone 24 pumps water and solid and soluble wastes produced by the invertebrates and fish. These wastes are delivered via a pipe 45 up to the top of the irrigated plant material zone 12 where they are sprayed over the top of the plant material or discharged into a seepage structure which spreads the water out over the top of the plant material. These solid and soluble wastes and the water conveying them then trickle down through the plant material in the irrigated zone 12 until they reach the submerged zone 14. Effluent from the water zone 24 is discharged via an effluent line 70. Some of the effluent is recycled by a pump 50, through a pipe 55 back to the influent stream 60 or back to the influent end of the submerged zone 14.

To connect these modular units in series to make a train, additional influent and effluent zones and one more solid material containing zone are added to a tank containing ten of the modular units that were described in FIGS. 9 and 10. To illustrate this configuration, the influent, effluent, and new solid material zones are added to a single modular unit, tank 120, and this is shown in top view in FIG. 11, and in side view in FIG. 12.

Here, a new influent zone 91 is added to receive some or all of the influent flow 60 and the recycle flow 55 prior to their introduction into the submerged plant material zone 14 in section 10 of the modular unit. In this new zone, the influent and the recycle flows will be pretreated with air or oxygen supplied by an aeration device 30 and may be mixed together before they pass through a porous net or fence type barrier 82 which holds the plant material in zone 10 and prevents it from mixing into zone 91.

As shown in FIG. 10, some or all of the influent flow 60 may be applied or spray irrigated at the top of the irrigated zone 12. The influent can be applied directly or combined with the recycle flow from the bottom of the water zone 20. This influent will also trickle down through the irrigated zone and then enter the submerged zone 14.

A second plant material zone 11, which is just like plant material zone 10, is located after the water zone 20. A final zone 95 is also added to the modular unit, right after the second plant material zone 11, to further treat the effluent prior to its discharge or recycle. This additional treatment will comprise aeration, but options will exist for mixing, filtration, chemical addition for the precipitation of nutrients, or other similar treatment procedures, if these are found to be necessary for effective operation.

Figure 11:
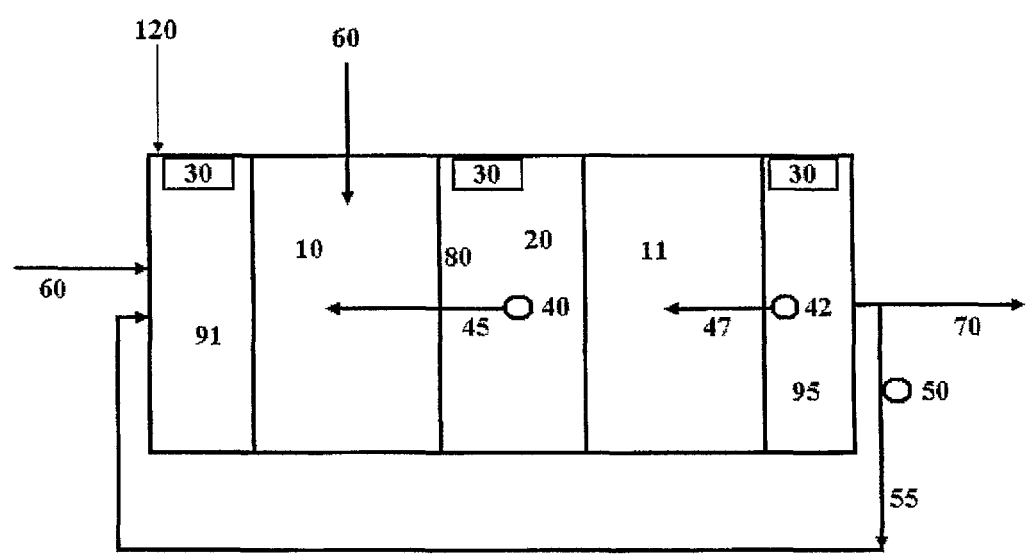
FIG. 11 is a schematic representation of a top view of a recirculating system module expanded to accommodate insertion of additional modules in accordance with an embodiment of the present invention.
Figure 12:
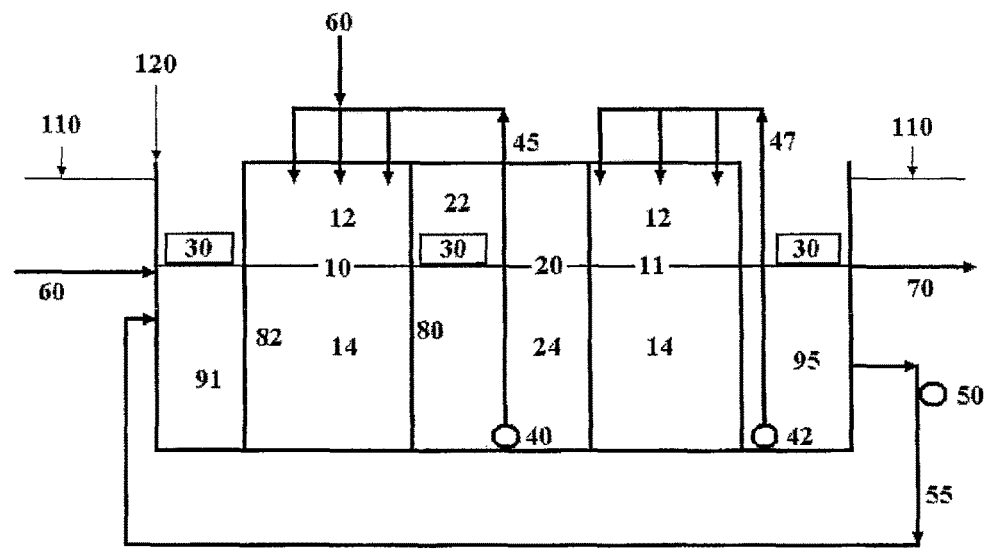
FIG. 12 is a schematic representation of a side view of a recirculating system module expanded to accommodate insertion of additional modules in accordance with an embodiment of the present invention.
Figure 13:
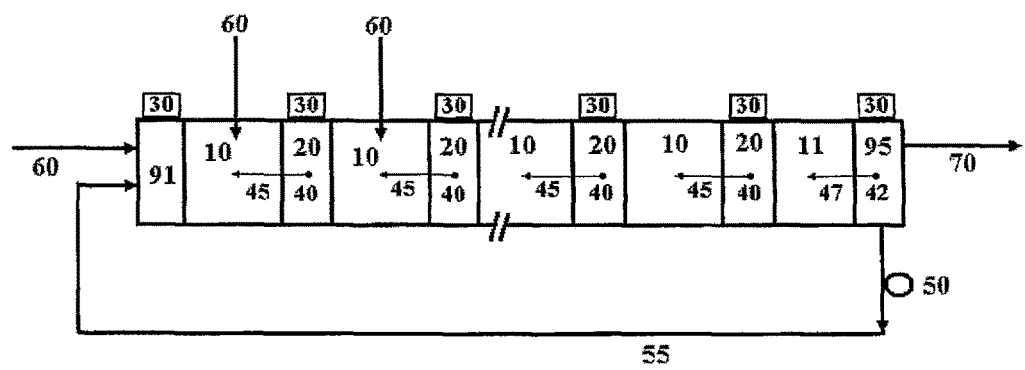
FIG. 13 is a schematic representation of a top view of a linear ten module recirculating system in accordance with an embodiment of the present invention.

In the wastewater treatment application, the configurations shown in FIGS. 11 and 12 are expanded to include ten modular units as shown from a top view in FIG. 13 (only four of the ten modular units are shown in the Figure so that the influent and effluent ends of the train can be easily illustrated). Here the modular units as shown in FIGS. 9 and 10 are combined with the additional zones 11, 91, and 95 as shown in FIGS. 11 and 12 to produce a linear apparatus with multiple solid material and water treatment zones. The influent flow 60 may be mixed with a recycle flow 55 and then passed into the first of a series of alternating plant material zones 10 and water zones 20.

Alternatively, fractional distributions of the influent flow may be applied to the top of the first several plant material zones within the train. The number of modules that receive influent directly will be a function of Total Suspended Solids (TSS) loading and Flow. This number will generally not exceed half of the total number of modules in any given train. Thus, no more than 5 modules will receive some fraction of the influent flow directly in this application.

The remaining 5 modules will only receive water from the module immediately preceding it in the train. Thus, the downstream modules will serve more of a water purification function while the upstream modules will serve solids collection and processing functions as well as nutrient capture and water purification functions.

For all of the modules, some of the solid and soluble wastes produced in the water zones will be recycled back to the immediately upstream plant material zone of the module where they will be removed from the water flow. A series of porous nets or fences, shown as 80 in FIGS. 9 through 12, separates the various zones while still allowing microbial and small organism migration back and forth between the plant material zones and the water zones.

The presence of the plant material zone 11 allows each train to be operated with flow going either way. This conveys unique advantages when treating wastewater with significant TSS concentrations. In such cases, a train will first be put into operation with the influent flow being distributed to the first five modules in the train. After the train has been in operation for 200 days, these five modules will have reached their solids loading limit. At this point, the train will be temporarily taken out of service and the solids in the first five modules will be removed. Then new solids will be added and the train will be put back into service. However, when this occurs, the flow through the train will be reversed so that the 5 modules that previously served as the effluent water polishing modules will now be serving as solids capturing modules. The five modules with new solid material just added will start service at the effluent end as water polishing modules.

An additional note on these systems is that they will serve as extensive and comprehensive biomonitoring systems to validate the environmental quality of the effluent and the treatment process. A simple procedure in which regular observations are recorded of a variety of different organism populations within the treatment system will verify the lack of toxic effects on the surrounding and receiving environment. Such a procedure greatly enhances the goal of protecting the environment and our resident populations that now primarily depend on the chemical testing for effluent limitations.

Case Studies

To illustrate the apparatus and process of the invention consider the following case studies.

Case 1:

A small village of about 3,500 people is located in the middle of an extensive fruit growing region and there are several fruit/food processors that contribute significantly to the municipal wastewater system. The village has a two-stage activated sludge WPCF that was built in 1975 and which was designed to treat effluent flows from the fruit processors in addition to the municipal wastewater stream.

While the WPCF has had some upgrades and improvements over the years, principally in solids dewatering, disinfection, and headworks design, it is still essentially the same facility that was built in 1975. The WPCF is in compliance with its existing SPDES permit but because of the age of the facility and its equipment, it is under pressure to make substantial modifications to insure compliance in the future.

The annual average loading to the WPCF is shown in Table 1.

TABLE 1

| Influent Loading Data | | |
|---|---|---|
| Parameter | Units | Value |
| Flow | MGD | 1.22 |
| TSS | Lbs/day | 2,026 |
| CBOD | Lbs/day | 4,281 |
| TKN | Lbs/day | 136 |
| Total Phosphorus | Lbs/day | 21 |

Note: TSS represents Total Suspended Solids, CBOD represents Carbonaceous Biochemical Oxygen Demand, and TKN represents Total Kjeldahl Nitrogen.

The apparatus and process of the invention can be applied to this situation either as a complete replacement system or as a modification to various processes within the existing facility design. For example, it could be used for effluent polishing or for solids stabilization and dewatering. The latter could produce a final material that could be used as a soil amendment or as a renewable energy substrate, thereby eliminating the need to landfill the material.

A full scale replacement for the existing WPCF would result in a requirement for 24 ten module trains. Each train would be 142 feet long and 13 feet wide (including alleyways). These 24 trains could be accommodated in two barns measuring 350 feet by 100 feet. A third barn would also be desirable as a place to stage and handle both input wood chips and pumice and the bioconverted production residue.

Such a system would produce a solid residue of 2,143 wet tons per year with a moisture content of 60%. This compares with the existing operation which produced 1,989 wet tons in 2011 with a moisture content of 78%. This sludge from the existing WPCF was trucked to a landfill for final disposal. In contrast, the solid residue from the apparatus of the invention should have an energy content of about 9,000 BTUs per pound dry weight and thus would be an amenable material for cogeneration in a coal fired power plant. After drying of the residue, there would be over 15,000 MBTUs of usable energy from this material.

Alternatively, the material may be useful for a soil amendment, fertilizer, or potting soil. A market for these products can be developed based on the levels of contaminants that may or may not be present in the influent wastewater and that, if present, might accumulate in the soil products. The given WPCF wastewater has very low concentrations of heavy metals with only zinc, copper, and nickel being normally detected. Since all three of these metals are in fact requirements for biological systems, low concentrations should not provide a toxicity problem. Other more dangerous heavy metals have not been detected in the past but would have to be analyzed for in any potential soil products prior to a determination as to their eventual value and market.

Organic contaminants such as insecticide sprays used in fruit farming which might find their way into the influent wastewater also do not seem to be a problem. Virtually all of these should be biodegradable by the treatment system if indeed they are found to be present at all. Therefore, it seems reasonable to project some form of at least a cost neutral home for the solid residuals derived from the treatment process. Ideally, the reuse of these materials should generate some income.

The system could also produce over 93,000 pounds of fish per year or 390,000 pounds of harvestable invertebrates. These will be even more sensitive to the toxic possibilities but if they test clean, there could be a substantial market for them in the feed or food categories. Psychological factors would be a concern, at least initially, for consuming them as food but a pet food or feed application would seem to be an attractive first step in developing markets.

Case 2:

The apparatus and process of the invention also comprises a means for treating the effluent from CAFOs. In this example, a bioreactor treating the manures and wastewaters from an operating dairy farm provides the influent to the system. The objective of the system is to remove 90 to 95 percent of the TSS, CBOD, TKN, and Total Phosphorus from the bioreactor effluent, to trap most of these solids and nutrients in a wood chip and microorganism matrix comprising at least 30 percent solids, and to produce significant quantities of invertebrates and/or fish.

The apparatus of the invention comprises a series of 30 cubic yard tanks such as rolloffs or equivalent tankage, modified in accordance with the process of the invention.

Figure 14:
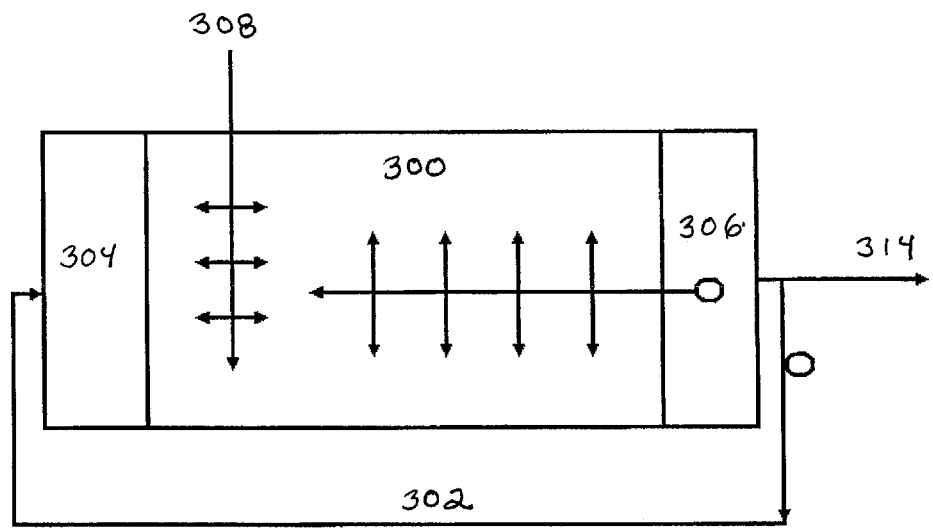
FIG. 14 is a schematic representation of a top view of a single tank recirculating system in accordance with an embodiment of the present invention.
Figure 15:
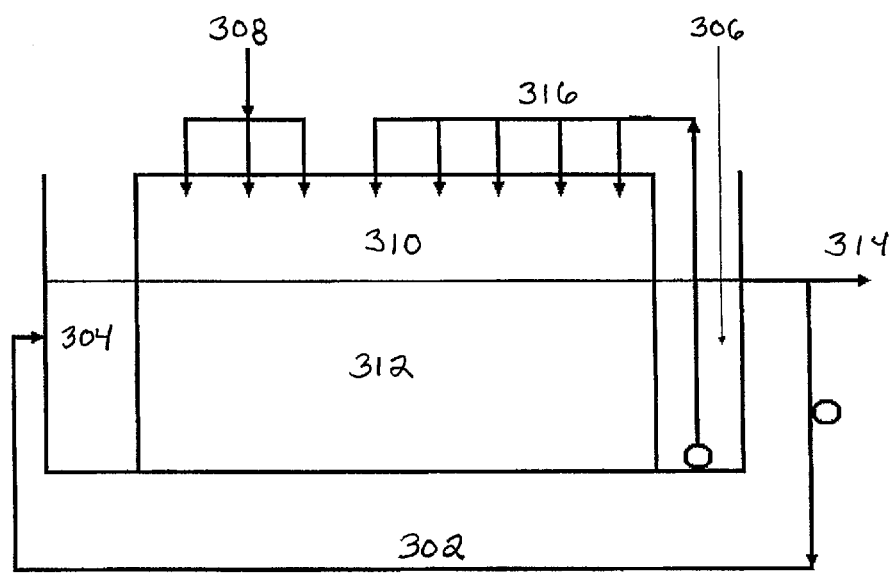
FIG. 15 is a schematic representation of a side view of a single tank recirculating system in accordance with an embodiment of the present invention.

Each tank in the system will be configured as shown in FIG. 14, a top view, and FIG. 15, a side view. In each tank there will be a large zone containing wood chips which will be piled up to the depth of the rolloff or higher. Several feet of the chip zone 300 will be submerged in water. There will also be water zones at each end of the tank and these water zones will be separated from the chip zone by a mesh barrier. This barrier will allow water to pass freely into and out of the chip zone, but will prevent any chips from entering the water zones.

There will be a pumped water recycle flow 302 from one water zone 304 to the other 306 and this will establish a flow through the submerged portion of the chip pile. There will also be a second sprayed recycle from the bottom of the downstream water zone to the top of the perched chip zone. This will transfer any solid material that has settled to the bottom of the downstream water zone. This sprayed recycle will be pumped back up to the top of the chip pile.

Influent 308 from the bioreactor effluent will be introduced into the tank system at the top of the perched chip zone 310 towards the upstream water zone. As this influent trickles down through the perched chips, it will enter the submerged chip zone 312 and will then flow through the rest of the submerged chip zone until it enters the downstream water zone. There it will be recycled in both the water and the sprayed recycle 316 flows as previously described.

Fine bubble aeration will be supplied at the bottom of each water zone. Fine or coarse bubble aeration will also be supplied at spaced intervals at the bottom of the chip zone. The rates of aeration will be adjusted to maintain dissolved oxygen levels in the two water zones at 2.0 mg/l of DO or higher. Aeration within the chip zone will be adjusted to prevent obvious zones of anaerobic activity from forming. The actual rates of aeration and consequent oxygen load will be a function of temperature and the size and growth rates of the microbial and invertebrate populations within the chip zones.

The tanks can receive influent in either a continuous feed or batch form. If a batch mode is selected, then a daily interval would be preferred. Effluent 314 would be pumped out of the tanks just before influent would be pumped in to maintain working water volumes. If a continuous feed is selected, then effluent from the tanks would be periodically pumped out using a level control procedure. This assumes that a gravity overflow from a tank structure would not be practical.

Each tank will be fed 829 gallons per day of bioreactor effluent as characterized in Table 1. For each 100 days, the tank will require a total of 6,570 pounds of wood chips on a dry weight basis. 5,000 pounds of dry weight chips will be placed in the chip zone at startup and the remaining 1,670 pounds of dry weight chips will be added as necessary for each 100 day run. Recycle flows will vary depending on actual performance. Typically, the water recycle will average about two to four gpm and the spray recycle will comprise a 40 gpm flow for two minutes each hour.

The 829 gallons of influent flow will result in a daily loading to the tank of 69.1 pounds of TSS, 17.1 pounds of particulate nitrogen, and 2.9 pounds of particulate phosphorus. This information is summarized in Table 1. The tank will remove 95 percent of these constituents on an average basis. Thus, assuming that there is minimal evaporation, there will be an average daily effluent from the tank as shown in Table 2.

TABLE 1

Average System Daily Influent Parameters

| Parameter | Gallons per day | Lbs/day | Mg/l | Percent |
|---|---|---|---|---|
| Flow | 829 | | | |
| Total Solids | | 104 | 15,000 | 1.5% |
| TDS | | 34.6 | 5,000 | 0.5% |
| TSS | | 69.1 | 10,000 | 1.0% |
| Total Nitrogen | | 24.8 | 3,587 | |
| Dissolved N | | 7.7 | 1,114 | |
| Particulate N | | 17.1 | 2,473 | |
| Total P | | 3.3 | 477 | |
| Dissolved P | | 0.4 | 58 | |
| Particulate P | | 2.9 | 419 | |

TABLE 2

Average System Daily Effluent Parameters

| Parameter | Gallons per day | Lbs/day | Mg/l | Percent |
|---|---|---|---|---|
| Flow | 829 | | | |
| Total Solids | | 38.0 | 5,500 | 0.55% |
| TDS | | 34.6 | 5,000 | 0.50% |
| TSS | | 3.5 | 500 | 0.05% |
| Total Nitrogen | | 8.9 | 1,293 | |
| Dissolved N | | 7.7 | 1,114 | |
| Particulate N | | 1.2 | 179 | |
| Total P | | 0.6 | 82 | |
| Dissolved P | | 0.4 | 58 | |
| Particulate P | | 0.2 | 24 | |

At the end of the 100 day interval, the water will be pumped out of the tank and any remaining invertebrates will be removed from the water and the solids. The solids will then be sent offsite for incineration. The wood chip residue will have a heat value of between 9,000 to 10,000 BTUs per pound dry weight.

What is claimed is:

1. A system for nutrient capture, comprising:
a tank comprising a body of water, the tank having a plant material zone comprising plant material contacting at least a part of the body of water, wherein the plant material zone produces a microbial biomass by degrading the plant material contained within the plant material zone;
a fish raising zone having fish therein, the fish raising zone defined within the tank and comprising at least a portion of the body of water, the fish raising zone separated from the plant material zone by a separate porous filter separate from the plant material zone, wherein the porous filter restrains fish from passing from the fish raising zone into the plant material zone and allows the microbial biomass from the plant material zone to pass into the fish raising zone;
a tank influent stream, wherein at least a portion of the body of water passes through the plant material zone and subsequently transfers the microbial biomass from the plant material zone through the porous filter and into the fish raising zone as a food source for the fish within the fish raising zone; and
a recycle loop, comprising:
a pump disposed within the fish raising zone for pumping a waste product from the fish raising zone to the plant material zone, wherein the waste product from the fish raising zone assists in the formation of the microbial biomass by degrading the plant material contained within the plant material zone to contribute to the food source for the fish.

2. The system of claim 1, wherein the plant material zone comprises submerged plant material.

3. The system of claim 1, wherein the plant material zone comprises irrigated plant material.

4. The system of claim 1, wherein the tank influent stream passes through the porous filter after passing through the plant material zone and prior to passing through the fish raising zone.

5. The system of claim 1, wherein the fish raising zone comprises an aerator in communication with at least a portion of the body of water.

6. The system of claim 1, wherein the recycle loop further comprises a connection pipe between the fish raising zone and the plant material zone, the connection pipe structured to deliver the pumped waste product from the fish raising zone to the plant material zone.

7. The system of claim 6, wherein the plant material zone comprises plant material irrigated by the pumped waste product from the fish raising zone.

8. The system of claim 1, wherein the waste product from the fish raising zone is concentrated fish excrement.

9. The system of claim 1, further comprising a tank effluent stream, wherein at least a portion of the body of water defined in the fish raising zone is directed to the tank influent stream.

10. A system for nutrient capture, comprising:
a tank comprising a body of water, the tank having a submerged plant material zone comprising plant material submerged within the body of water, wherein the plant material zone produces a microbial biomass by degrading the plant material contained within the plant material zone;
an irrigated plant material platform, comprising additional plant material which is separated from the submerged plant material;
an animal raising zone, having animals therein, the animal raising zone in fluid communication with at least a portion of the body of water, the animal raising zone separated from the submerged plant material zone by a separate porous filter separate from the plant material zone, wherein the porous filter restrains animals from passing from the animal raising zone into the plant material zone and allows the microbial biomass from the plant material zone to pass into the animal raising zone;
a tank influent stream, wherein at least a portion of the body of water passes through the plant material zone and subsequently transfers the microbial biomass from the plant material zone through the porous filter and into the animal raising zone as a food source for the animals within the animal raising zone; and
a recycle loop, comprising:
a pump disposed within the animal raising zone for pumping a waste product from the animal raising zone to the irrigated plant material platform, wherein the waste product from the animal raising zone assists in the formation of the microbial biomass by degrading the plant material contained within the plant material zone to contribute to the food source for the animals.

11. The system of claim 10, wherein the irrigated plant material platform is disposed above the submerged plant material zone of the tank.

12. The system of claim 10, wherein the irrigated plant material platform is separate from the tank and the submerged plant material zone.

13. The system of claim 10, wherein the waste product pumped to the irrigated plant material platform passes through the additional plant material and is subsequently returned to the body of water within the tank.

14. The system of claim 10, wherein the tank influent stream passes through the porous filter after passing through the submerged plant material zone and prior to passing through the animal raising zone.

15. The system of claim 10, wherein the animal raising zone comprises an aerator in communication with at least a portion of the body of water.

16. The system of claim 10, wherein the recycle loop further comprises a connection pipe between the animal raising zone and the irrigated plant material platform, the connection pipe structured to deliver the pumped waste product from the animal raising zone to the irrigated plant material platform to irrigate the additional plant material with the pumped waste product.

17. The system of claim 10, wherein the animal raising zone is a fish raising zone, and wherein the waste product from the animal raising zone is concentrated fish excrement.

18. The system of claim 10, further comprising a tank effluent stream, wherein at least a portion of the body of water defined in the animal raising zone is directed to the tank influent stream.

19. The system of claim 18, further comprising an effluent aerator, wherein at least a portion of the tank effluent stream is aerated prior to being directed to the tank influent stream.

20. The system of claim 10, further comprising a plurality of tanks, each tank having at least one animal raising zone, and a plurality of recycle loops, each recycle loop comprising a pump, wherein the tank influent stream is directed to the plurality of tanks, each tank having at least one animal raising zone, and wherein the plurality of recycle loops pumps a waste product from each of the animal raising zones to the irrigated plant material platform.

* * * * *